United States Patent
Pinnekamp et al.

(10) Patent No.: US 10,584,748 B2
(45) Date of Patent: Mar. 10, 2020

(54) PLAIN BEARING AND METHOD FOR PRODUCING THE SAME

(71) Applicant: RENK AKTIENGESELLSCHAFT, Augsburg (DE)

(72) Inventors: Burkhard Pinnekamp, Augsburg (DE); Florian Hofbauer, Landsberg am Lech (DE); Carsten Greisert, Augsburg (DE); Michael Keller, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 0 days.

(21) Appl. No.: 15/621,770

(22) Filed: Jun. 13, 2017

(65) Prior Publication Data
US 2017/0356494 A1    Dec. 14, 2017

(30) Foreign Application Priority Data
Jun. 14, 2016 (DE) .................. 10 2016 110 858

(51) Int. Cl.
*F16C 33/12* (2006.01)
*F16C 33/28* (2006.01)

(52) U.S. Cl.
CPC .......... *F16C 33/127* (2013.01); *F16C 33/121* (2013.01); *F16C 33/124* (2013.01); *F16C 33/125* (2013.01); *F16C 33/28* (2013.01); *F16C 2208/36* (2013.01)

(58) Field of Classification Search
CPC .... F16C 33/121; F16C 33/124; F16C 33/125; F16C 33/127; F16C 33/14; F16C 33/28
See application file for complete search history.

(56) References Cited

U.S. PATENT DOCUMENTS

| | | | | |
|---|---|---|---|---|
| 5,229,198 A * | 7/1993 | Schroeder | ............... | B32B 27/04 442/7 |
| 6,465,089 B2 * | 10/2002 | Niwa | ..................... | C08K 3/08 428/323 |
| 6,548,188 B1 * | 4/2003 | Yanase | .................. | F16C 33/201 384/300 |
| 7,118,808 B2 * | 10/2006 | Wolki | ..................... | F16C 33/28 428/626 |
| 2005/0260431 A1 | 11/2005 | Wolki et al. | | |

(Continued)

FOREIGN PATENT DOCUMENTS

| | | |
|---|---|---|
| CN | 201359016 Y | 12/2009 |
| CN | 102943810 | 2/2013 |
| CN | 103502665 | 1/2014 |

(Continued)

OTHER PUBLICATIONS

Office Action dated Jun. 25, 2019 issued in Chinese Patent Application No. 20170448154.0.

*Primary Examiner* — James Pilkington
(74) *Attorney, Agent, or Firm* — Cozen O'Connor

(57) ABSTRACT

A plain bearing, having a bearing base body made from a metallic material, having an intermediate layer made from a metallic material applied onto the bearing base body, and having a plain-bearing layer made from a non-metallic material applied onto the intermediate layer. The intermediate layer is an arrangement of wires or a perforated plate. The arrangement of wires or the perforated plate forms undercuts and the plain-bearing layer is a layer made from polyether ether ketone.

14 Claims, 3 Drawing Sheets

(56) References Cited

U.S. PATENT DOCUMENTS

2013/0023451 A1\* 1/2013 Matsuhisa ............ F16C 33/205
                                                                    508/103

FOREIGN PATENT DOCUMENTS

| | | |
|---|---|---|
| CN | 105624601 | 6/2016 |
| DE | 698 31 675 | 6/2006 |
| DE | 11 2010 005 433 | 3/2013 |
| DE | 10 2013 202 123 | 5/2014 |
| EP | 1 552 172 | 7/2005 |
| GB | 821472 | \* 10/1959 |

\* cited by examiner

PLAIN BEARING AND METHOD FOR PRODUCING THE SAME

BACKGROUND OF THE INVENTION

1. Field of the Invention

The invention relates to a plain bearing and a method for producing a plain bearing.

2. Description of the Related Art

Plain bearings known from practice typically have a bearing base body made from a metallic material, onto which a plain-bearing layer made from a likewise metallic material is applied either directly or indirectly by an intermediate layer. In plain bearings known from practice, the bearing base body is typically manufactured from steel and the plain-bearing layer is typically manufactured from white metal or bronze. In plain bearings known from practice, to produce the plain bearings, a white-metal material or a bronze material is sprayed onto the bearing base body or the intermediate layer applied onto the bearing base body, in order to ensure a good adhesion of the plain-bearing layer.

Although plain bearings known from practice already have good properties with regards to desired sliding properties and a desired wear resistance, there is a need to further improve plain bearings with regards to the properties thereof. Therefore, attempts are already being undertaken to replace plain-bearing layers made from metallic materials with plain-bearing layers made from a non-metallic material.

However, there is either the problem that the non-metallic material for the plain-bearing layer does not provide the desired plain-bearing properties or the method for producing such a plain bearing is too expensive.

SUMMARY OF THE INVENTION

One aspect of the present invention is based creating a novel plain bearing with improved properties and a method for the simple production of the plain bearing.

In one embodiment, the intermediate layer is an arrangement of wires or a perforated plate, wherein the arrangement of wires or the perforated plate forms undercuts, and the plain-bearing layer is a layer made from polyether ether ketone (PEEK) or other plastics. The intermediate layer can also be an open-celled metal foam. The plain-bearing layer can also be filled with reinforcing materials and lubricants. A plain bearing of this type has good sliding properties and high wear resistance. Furthermore, a plain bearing of this type can be produced in a simple manner.

The intermediate layer is preferably an arrangement of wires, wherein the arrangement of wires is preferably a wire fabric or a wire mesh or knitted wire fabric. The arrangement of wires can comprise wires made from different metallic materials and/or the wires can be coated galvanically. The adhesion of the plain-bearing layer made from polyether ether ketone on the intermediate layer can be particularly advantageously ensured hereby. Furthermore, a plain bearing of this type can be produced in a simple manner.

According to a further development, the arrangement of wires or the perforated plate is welded or soldered or adhesively bonded onto the bearing base body, wherein the plain-bearing layer made from polyether ether ketone is melted onto the arrangement of wires or the perforated plate. This makes a particularly simple production of the plain bearing possible. The plain-bearing layer can also be applied by an additive manufacturing method (3D printing).

According to one aspect of the invention, the bearing base body has a surface with undercuts, wherein the plain-bearing layer is constructed as a layer made from polyether ether ketone and is applied directly, that is to say without an intermediate layer between bearing base body and plain-bearing layer, onto the bearing base body in the region of the surface forming the undercuts. This plain bearing also has good sliding properties and high wear resistance and can furthermore be produced simply. The bearing base body can also be produced by an additive manufacturing method (3D printing).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred developments of the invention emerge from the dependent claims and the following description. Exemplary embodiments of the invention are explained in more detail on the basis of the drawing, without being limited thereto. In the figures:

DETAILED DESCRIPTION OF THE PRESENTLY PREFERRED EMBODIMENTS

Figure 1:
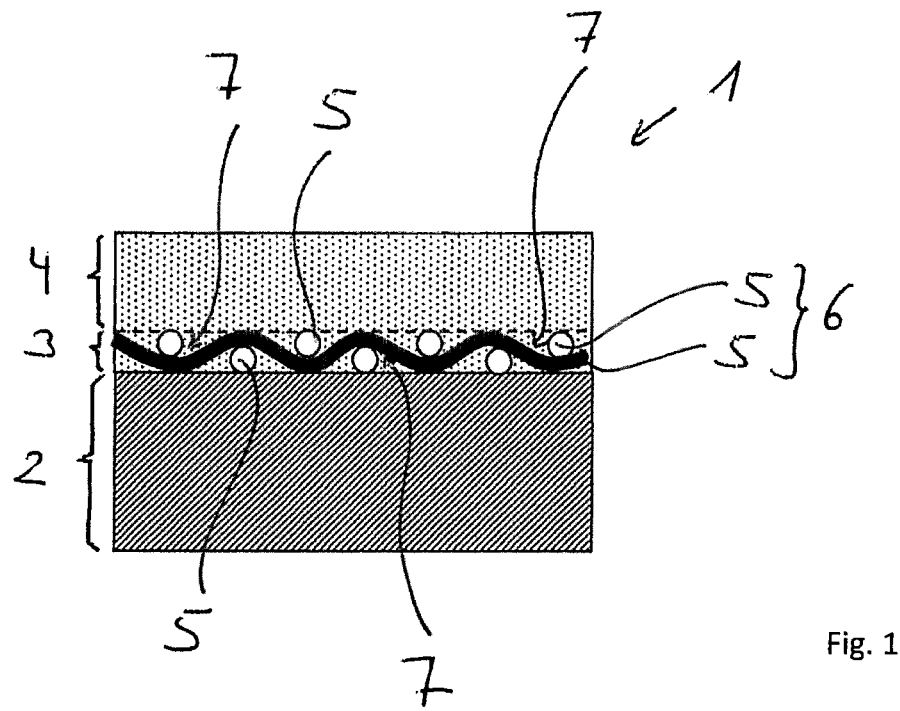
FIGS. 1, 1A, and 1B are schematized details from a plain bearing.

FIG. 1 shows a schematized cross section through a plain bearing 1 according to a first aspect of the present invention. This plain bearing 1 has a bearing base body 2 made from a metallic material, an intermediate layer 3 made from a likewise metallic material applied onto the bearing base body 2, and also a plain-bearing layer 4 made from a non-metallic material, namely from polyether ether ketone (PEEK), applied onto the intermediate layer 3.

According to the first aspect of the invention, the intermediate layer 3 made from the metallic material, which is applied onto the bearing base body 2 made from the metallic material, is an arrangement of wires 5 (shown for example in FIG. 1) or alternatively a perforated plate. The arrangement of wires 5 or the perforated plate forms undercuts 7. The plain-bearing layer 4 made from polyether ether ketone is applied onto such an intermediate layer 3 with undercuts 7, as a result of which a good adhesion of the plain-bearing layer 4 on the intermediate layer 3 and thus on the bearing base body 2 is ensured.

According to a first advantageous development of the first aspect of the invention, the intermediate layer 3 is an arrangement made up of the wires 5, wherein these wires 5 form a wire fabric or a wire mesh 6 (cf. FIG. 1) or a knitted wire fabric. In this case, the arrangement of wires 5 is preferably applied onto the bearing base body 2 by welding soldering, or adhesive bonding. A wire fabric or wire mesh or knitted wire fabric provides a multiplicity of undercuts 7.

The plain-bearing layer 4 made from polyether ether ketone can be melted onto an intermediate layer 3 of such a type with undercuts 7 particularly advantageously, specifically with the provision of a good adhesion of the plain-bearing layer 4 on the intermediate layer 3 and thus ultimately on the bearing base body 2.

As explained previously, the bearing base body 2 is a bearing base body made from a metallic material, preferably from steel or high-grade steel. The plain-bearing layer 4 is a layer made from polyether ether ketone, a thermoplastic plastic, which belongs to the polyaryletherketone group of materials. The wires 5 of the intermediate layer 3 and the bearing base body 2 are manufactured from a metallic material, thus the same may for example be manufactured from steel and/or high-grade steel and/or copper. It is provided in particular that the arrangement of wires 5 can have wires 5 made from different metallic materials, thus for example first wires 5 made from high-grade steel and second wires 5 made from copper. The thermal conductivity of the intermediate layer 3 can hereby advantageously be set.

The wires 5 shown by way of example in FIG. 1, which form the wire mesh 6, are round in cross section. However, it is also possible to use wires 5 with different cross-sectional shapes.

If the intermediate layer 3 is provided by an arrangement of wires 5 and the wires 5 form a wire fabric or a wire mesh 6 or a knitted wire fabric, a plurality of layers made from a wire fabric or a wire mesh 6 or a knitted wire fabric arranged above one another can particularly preferably form the intermediate layer 3. In the case of a plurality of layers made from a wire fabric or wire mesh or knitted wire fabric, the wires in the individual layers can be manufactured from different materials and/or have different cross-sectional shapes and/or run with a different orientation or different angle with respect to the bearing base body 2.

According to a second aspect of the invention, the intermediate layer 3 is provided by a perforated plate. A perforated plate of this type is in turn manufactured from a metallic material, particularly from high-grade steel, wherein holes of the perforated plate may have different shapes when forming undercuts, thus for example funnel shapes, mushroom-head shapes or the like. Also, the plain-bearing layer made from polyether ether ketone can adhere well to such an intermediate layer made from a perforated plate with corresponding undercuts and can consequently be applied reliably onto the bearing base body.

Figure 1A:
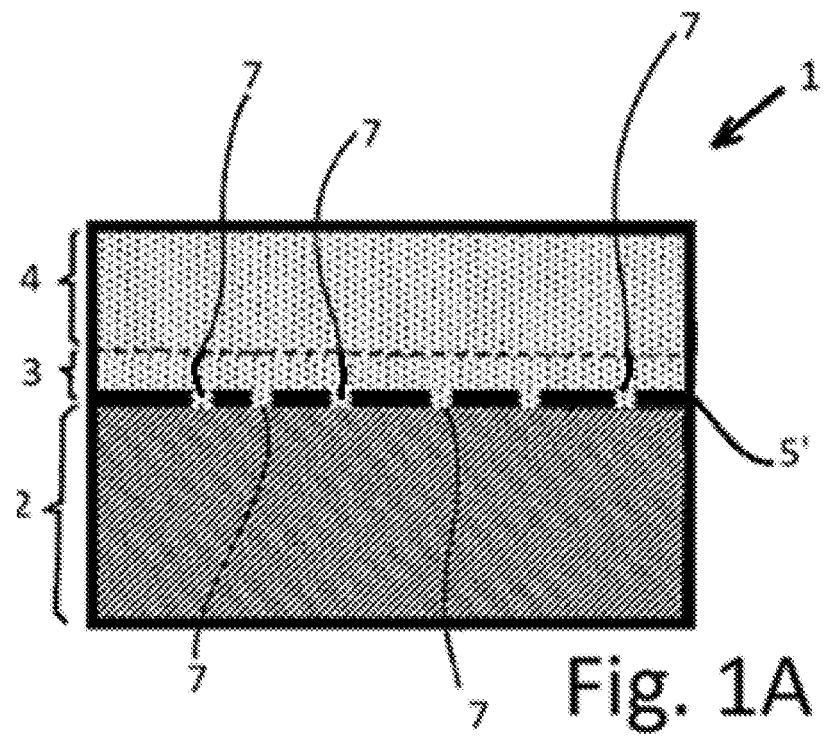
Figure 1B:
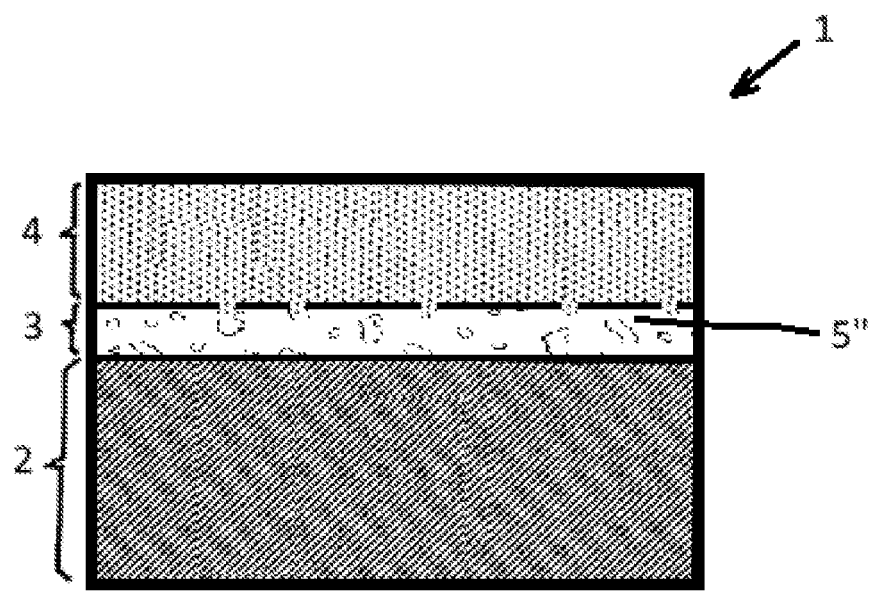

The intermediate layer 3, which is either an arrangement of wires 5, as shown in FIG. 1, or a perforated plate 5', as shown in FIG. 1A, or metal foam 5", as shown in FIG. 1B, is, as stated previously, preferably applied onto the bearing base body 2 by soldering or by welding or by adhesive bonding.

The soldering of the intermediate layer 3 onto the bearing base body 2 preferably takes place as hard soldering. In this case, a corresponding solder is fused with the intermediate layer and the bearing base body 2, wherein in the case of hard soldering, this solder is preferably brass or a silver alloy.

When soldering the intermediate layer 3 with the bearing base body 2, a copper film coated on both sides with a silver alloy is preferably used as solder, which then allows good expansion compensation between the bearing base body 2 and intermediate layer 3 and also between the intermediate layer 3 and plain-bearing layer 4. Preferably, a solder is used, which has a melting point considerably higher than the melting point of the plain-bearing layer, made from polyether ether ketone, which is later to be melted onto the intermediate layer.

The solder can be applied galvanically both onto the bearing base body 2 and onto the intermediate layer 3. Preferably, the soldering takes place by heating above the melting temperature of the material of the intermediate layer and under stabilizing pressure, wherein in the case of an arrangement of wires 5 as the intermediate layer, the wires 5 themselves solder.

Alternatively, the intermediate layer 3 can be applied to the bearing base body 2 by welding. During welding, the bearing base body 2 fuses with the intermediate layer 3 due to the introduction of locally high temperatures. In this case, the welding can take place as laser welding, plasma welding, or electric welding. In the case of metal foam as the intermediate layer, vibration or ultrasonic welding are suitable. When welding, the intermediate layer 3 and bearing base body 2 must be fixed with respect to each other, for example by mechanical pressing or magnetic fixing. In order to obtain the structure of the intermediate layer 3, only or alternatively a punctiform or linear welding of the intermediate layer 3 to the bearing base body 2 can also be used.

It is likewise possible to execute the welding by diffusion welding, wherein the bearing base body 2 and the intermediate layer 3 are then connected to one another by atomic bonding under mechanical pressure in a vacuum at a defined temperature.

Likewise, it is possible to connect the intermediate layer 3 and the bearing base body 2 to one another by adhesive bonding, particularly by using high-temperature-resistant adhesives. The connection of bearing base body 2 and intermediate layer 3 by soldering or by welding is preferred compared to adhesive bonding, however.

To produce a plain bearing 1, according to the first aspect of the invention, the bearing base body 2 made from the metallic material, particularly from steel or high-grade steel, is provided. Subsequently, the intermediate layer 3 made from the metallic material, which is constructed as an arrangement of wires 5 or as a perforated plate, is applied onto the base body 2, specifically either as an already finished fabric, mesh, or knitted fabric made from wire or a finished perforated plate, or individual wires are applied onto the bearing base body 2. Subsequently, the plain-bearing layer 4 made from polyether ether ketone is applied, namely melted onto the intermediate layer 3.

Figure 2:
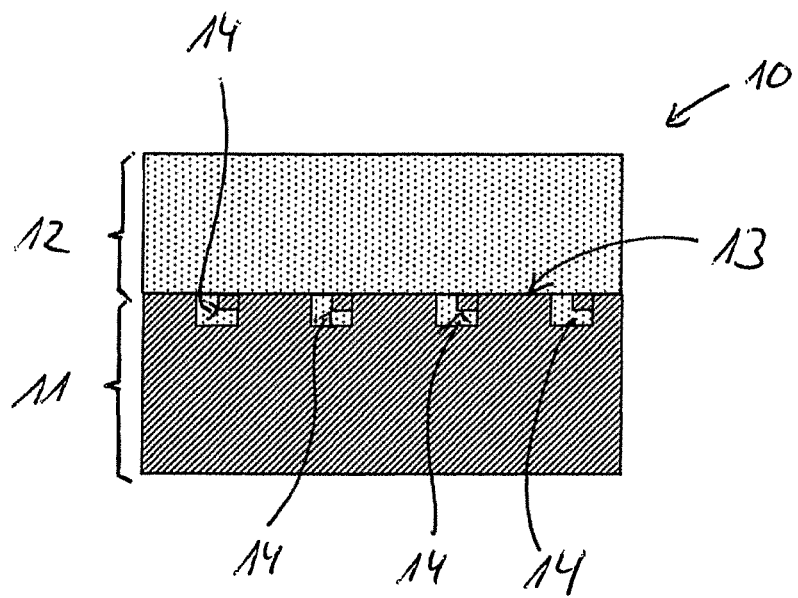
FIGS. 2, 2A, and 2B are schematized details from a plain bearing.

FIG. 2 shows a schematic cross section through a plain bearing 10 according to the invention, according to a second aspect of the present invention. This plain bearing 10 also has a bearing base body 11 made from a metallic material and a plain-bearing layer 12 made from polyether ether ketone, wherein, however, in the plain bearing 10 of FIG. 2, by contrast with the plain bearing 1 of FIG. 1, the plain-bearing layer 12 is not applied indirectly onto the bearing base body 11 by an intermediate layer, but rather directly, without such an intermediate layer, namely onto a surface 13 of the bearing base body 11, which forms or has undercuts 14.

Figure 2A:
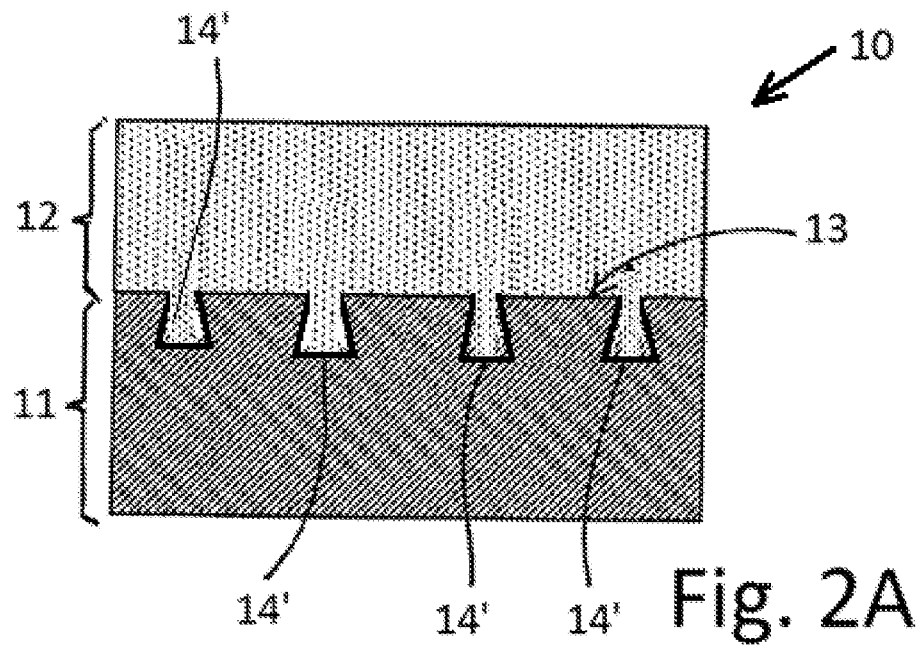
Figure 2B:
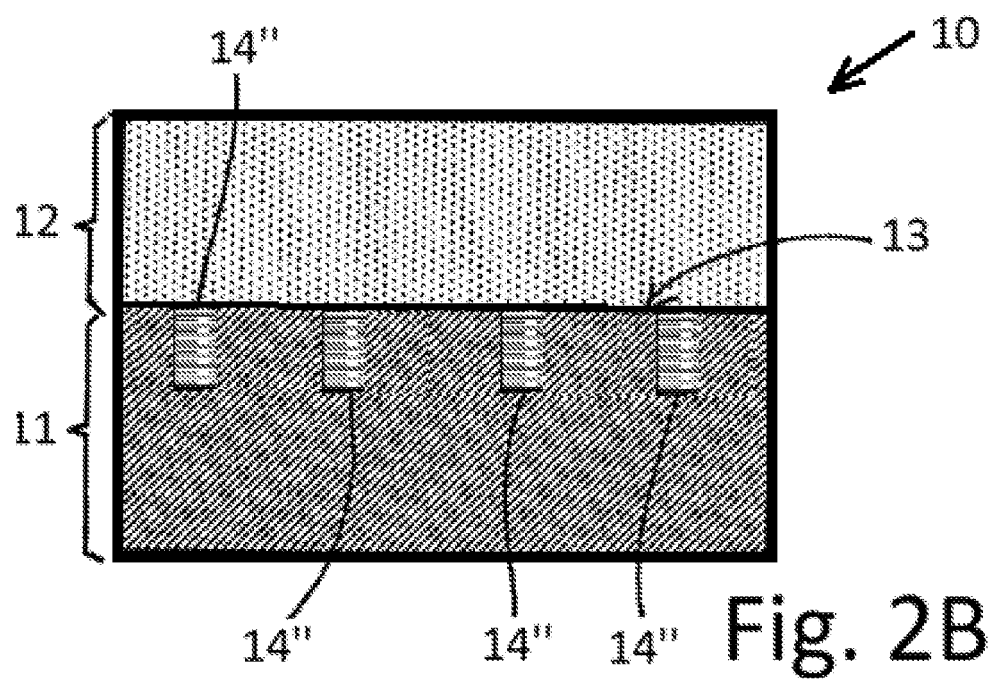

To this end, undercuts 14 are introduced into a bearing base body 11 made from steel or high-grade steel, preferably by milling, blasting, laser processing, or spark erosion, which undercuts 14 can have the shape of oblique grooves, threads (14" in FIG. 2B), dovetails (14' in FIG. 2A), or the like.

The plain-bearing layer 12 made from polyether ether ketone is applied, namely melted, onto such a bearing base body 11, namely onto the surface 13 of the bearing base body 11 having the undercuts 14. In this case, the plain-bearing layer 12 made from polyether ether ketone can contain fillers.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A plain bearing, comprising:
   a single bearing base body made from a single metallic material;
   an intermediate layer made from a second metallic material applied directly onto the bearing base body comprising one of an arrangement of wires, a perforated plate and an open-celled metal foam, wherein the arrangement of wires or the perforated plate forms undercuts;
   one of a copper film coated on both sides with solder to solder the single bearing base body to the intermediate layer or an adhesive layer to bond the intermediate layer onto the bearing base body; and
   a plain-bearing layer made from polyether ether ketone applied onto the intermediate layer.

2. The plain bearing according to claim 1, wherein the arrangement of wires is one of a wire fabric, a wire mesh, and a knitted wire fabric.

3. The plain bearing according to claim 1, wherein the plain-bearing layer made from polyether ether ketone is melted onto the one of the arrangement of wires, the perforated plate, and the open-celled metal foam.

4. The plain bearing according to claim 1, wherein the arrangement of wires are formed from at least one of steel, high-grade steel, and copper.

5. The plain bearing according to claim 1, wherein the arrangement of wires comprises wires made from different metallic materials.

6. The plain bearing according to claim 1, wherein the arrangement of wires of the intermediate layer are galvanically coated.

7. The plain bearing according to claim 1, wherein the single metallic material is steel.

8. The plain bearing according to claim 1, wherein the solder is a silver alloy solder.

9. A plain bearing, comprising:
   a single bearing base body made from a single metallic material;
   a plain-bearing layer made from a non-metallic material; and
   a surface of the bearing base body has undercuts configured as threads,
   wherein the plain-bearing layer is formed as a layer made from polyether ether ketone applied directly onto the bearing base body in the region of the surface forming the undercuts.

10. A method for producing a plain bearing comprising:
    providing a single bearing base body made from a single metallic material;
    applying an intermediate layer made from a second metallic material, which is constructed as one of an arrangement of wires, a perforated plate, and an open-celled metal foam directly onto the bearing base body;
    one of soldering the single bearing base body to the intermediate layer using a copper film coated on both sides with solder or adhesively bonding the intermediate layer onto the bearing base body; and
    applying a plain-bearing layer, which is formed from polyether ether ketone, onto the intermediate layer.

11. The method according to claim 10, wherein the plain-bearing layer is melted onto the one of the arrangement of wires and the perforated plate.

12. The plain bearing according to claim 10, wherein the solder a silver alloy solder.

13. A method for producing a plain bearing comprising:
    providing a single bearing base body made from a single metallic material;
    introducing undercuts into a surface of the bearing base body configured as threads; and
    applying a plain-bearing layer, which is formed as a layer made from polyether ether ketone, directly onto the surface of the bearing base body forming the undercuts.

14. The method according to claim 13, wherein one of:
    the undercuts on the surface of the bearing base body are constructed by at least one of milling, blasting, laser processing, or spark erosion; and
    the plain-bearing layer made from polyether ether ketone is melted onto the surface of the bearing base body forming the undercuts.

* * * * *